US009039305B2

United States Patent
Yamana

(10) Patent No.: US 9,039,305 B2
(45) Date of Patent: *May 26, 2015

(54) CAMERA

(71) Applicant: CANON KABUSHIKI KAISHA, Tokyo (JP)

(72) Inventor: Kazuaki Yamana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,511

(22) Filed: Jan. 30, 2013

(65) Prior Publication Data

US 2013/0202284 A1 Aug. 8, 2013

(30) Foreign Application Priority Data

Feb. 3, 2012 (JP) ................................. 2012-022146

(51) Int. Cl.
*G03B 19/12* (2006.01)

(52) U.S. Cl.
CPC ...................................... *G03B 19/12* (2013.01)

(58) Field of Classification Search
USPC ........................... 396/111, 268, 272, 354, 358
See application file for complete search history.

(56) References Cited

U.S. PATENT DOCUMENTS

| 8,734,030 B2 * | 5/2014 | Yamana ........................ 396/358 |
| 2010/0189428 A1 | 7/2010 | Kurahashi |
| 2011/0052177 A1 | 3/2011 | Yamana |
| 2013/0202283 A1 * | 8/2013 | Yamana ........................ 396/358 |
| 2013/0202284 A1 * | 8/2013 | Yamana ........................ 396/358 |
| 2013/0209084 A1 * | 8/2013 | Yamana ........................ 396/358 |

FOREIGN PATENT DOCUMENTS

| CN | 102004377 A | 4/2011 |
| EP | 2551718 A1 | 1/2013 |
| JP | 54-080746 U | 6/1979 |
| JP | 2008-287110 A | 11/2008 |
| JP | 2011-085762 A | 4/2011 |

OTHER PUBLICATIONS

U.S. Appl. No. 13/761,992, filed Feb. 7, 2013, Kazuaki Yamana.
U.S. Appl. No. 13/754,072, filed Jan. 30, 2013, Kazuaki Yamana.
English Translation of Notification of Reason for Refusal issued Dec. 10, 2013 in corresponding JP case.

* cited by examiner

*Primary Examiner* — W B Perkey
(74) *Attorney, Agent, or Firm* — Canon U.S.A., Inc. IP Division

(57) ABSTRACT

A mirror holder includes a cam portion, and a rotating member includes a follower portion arranged to be able to trace the cam portion. When the mirror holder is at a mirror-down position, the follower portion traces a first region of the cam portion to urge the mirror holder toward the mirror-down position by an urging force of an urging member. When the mirror holder is at a mirror-up position, the follower portion traces a second region of the cam portion to urge the mirror holder toward the mirror-up position by the urging force of the urging member. When the mirror holder is at an intermediate position between the mirror-down position and the mirror-up position, a contact portion is contacted with an edge of a hole by the urging force of the urging member.

6 Claims, 16 Drawing Sheets

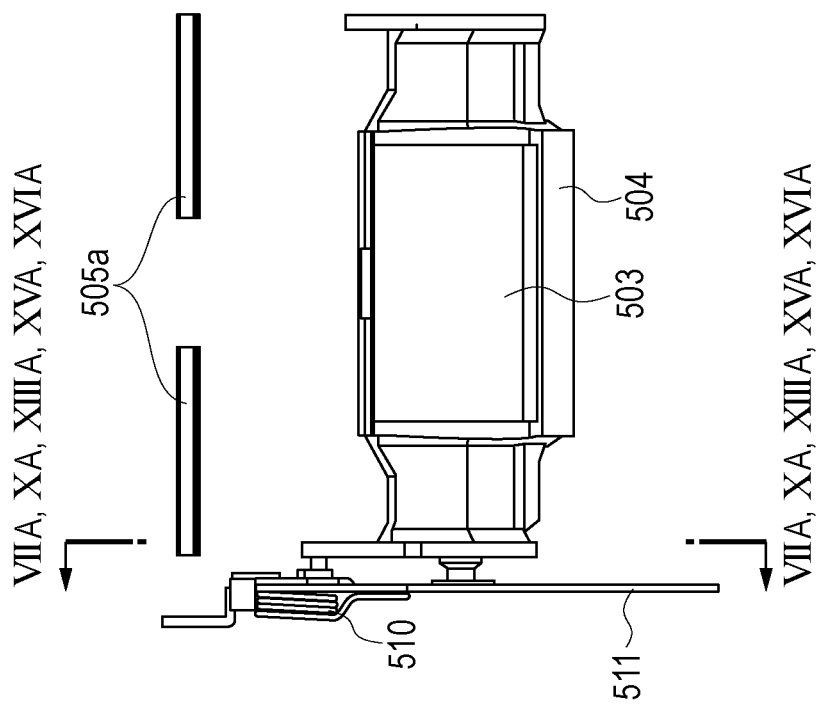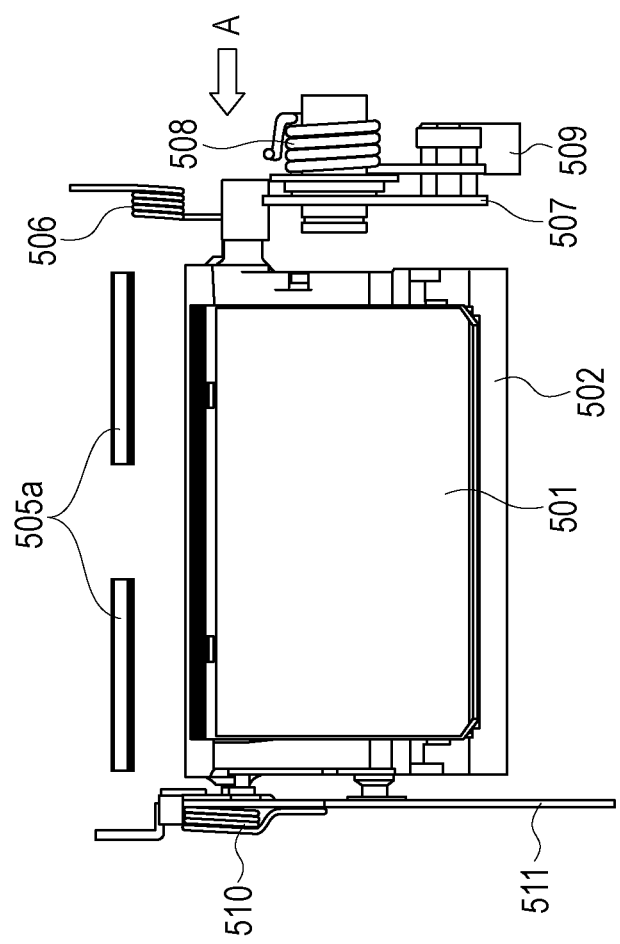

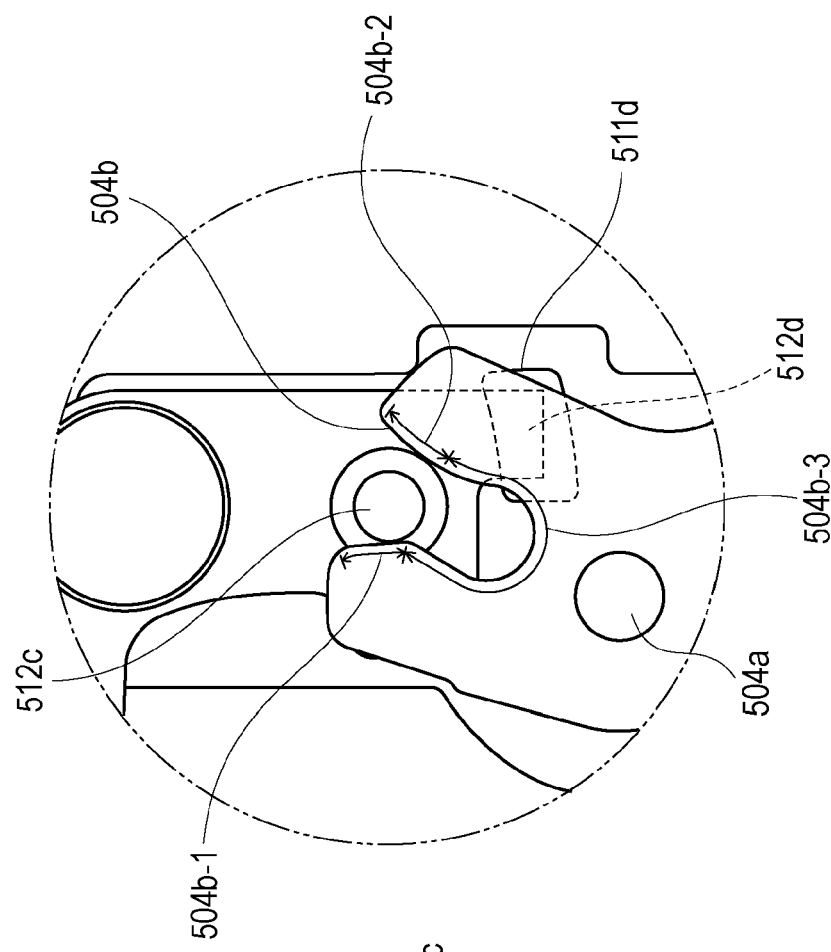
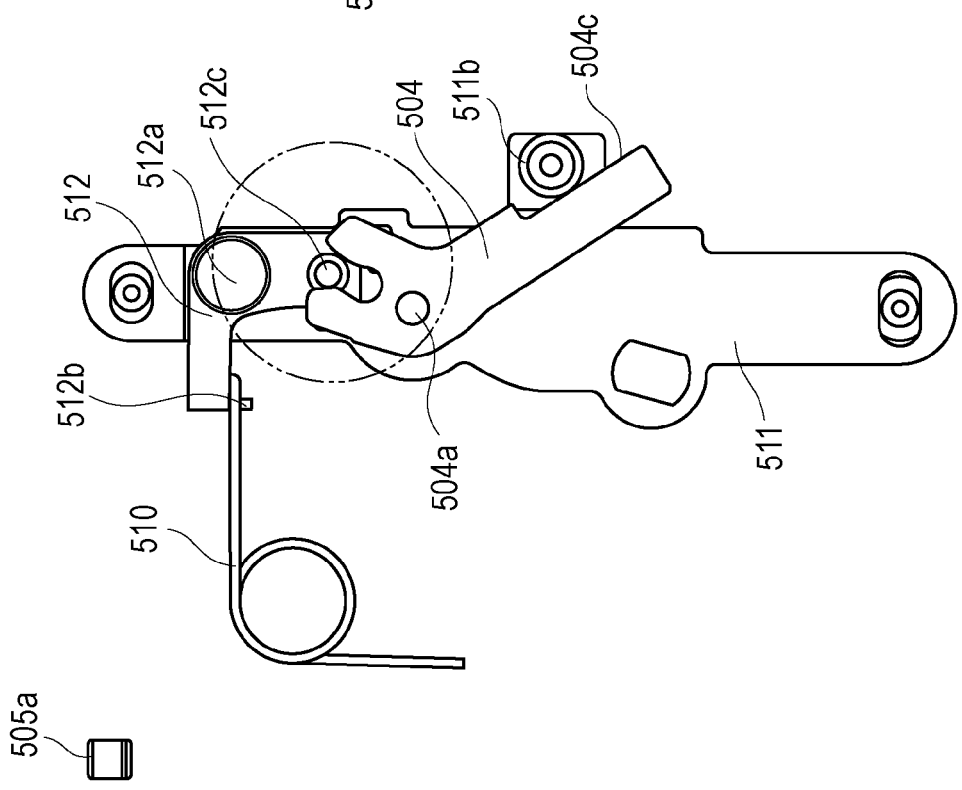
FIG. 7A
FIG. 7B

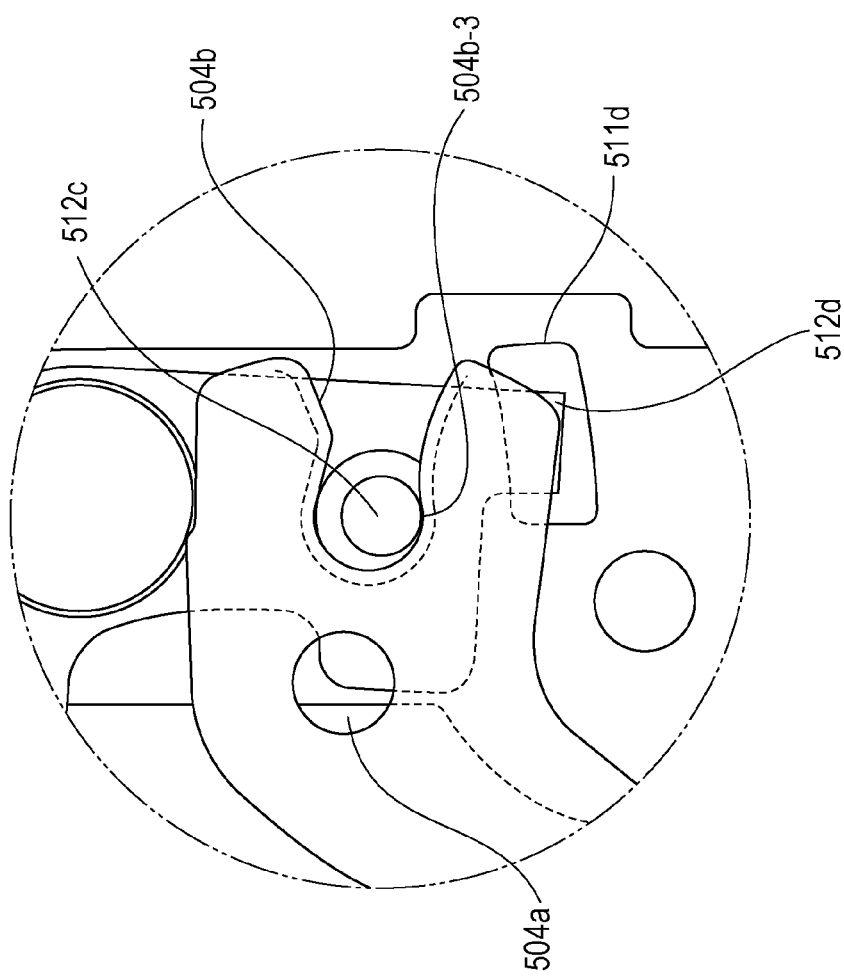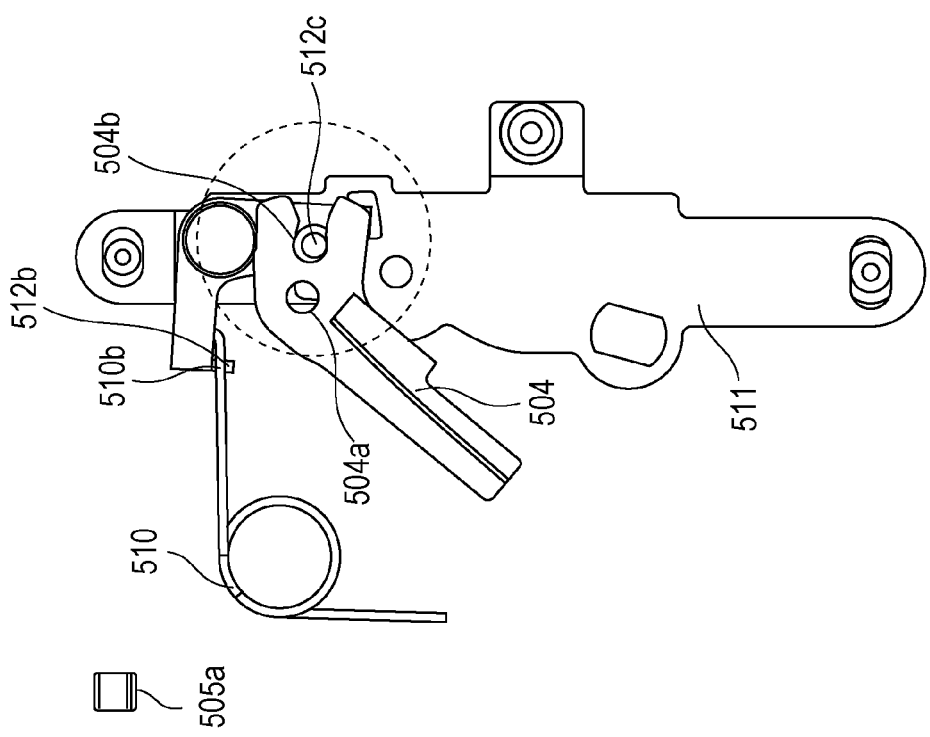

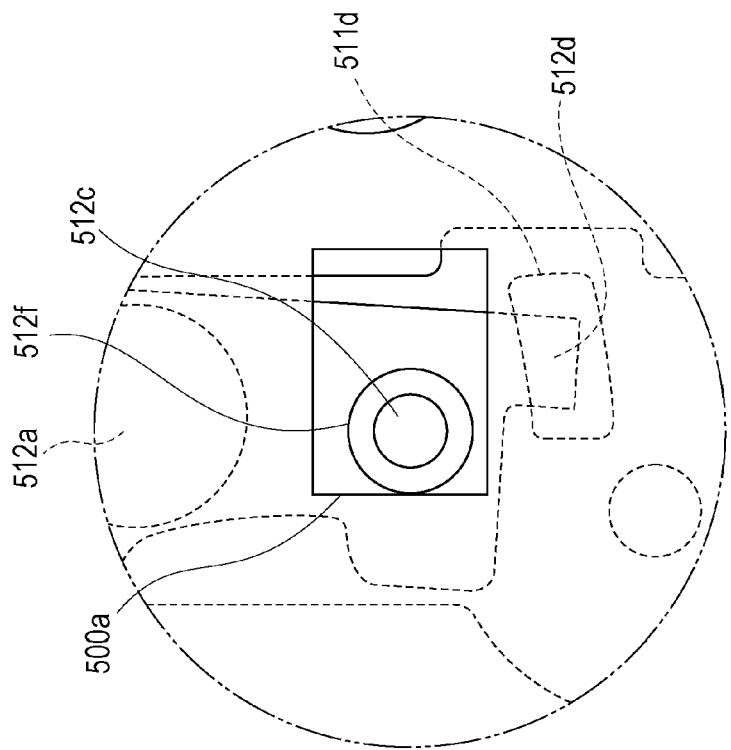
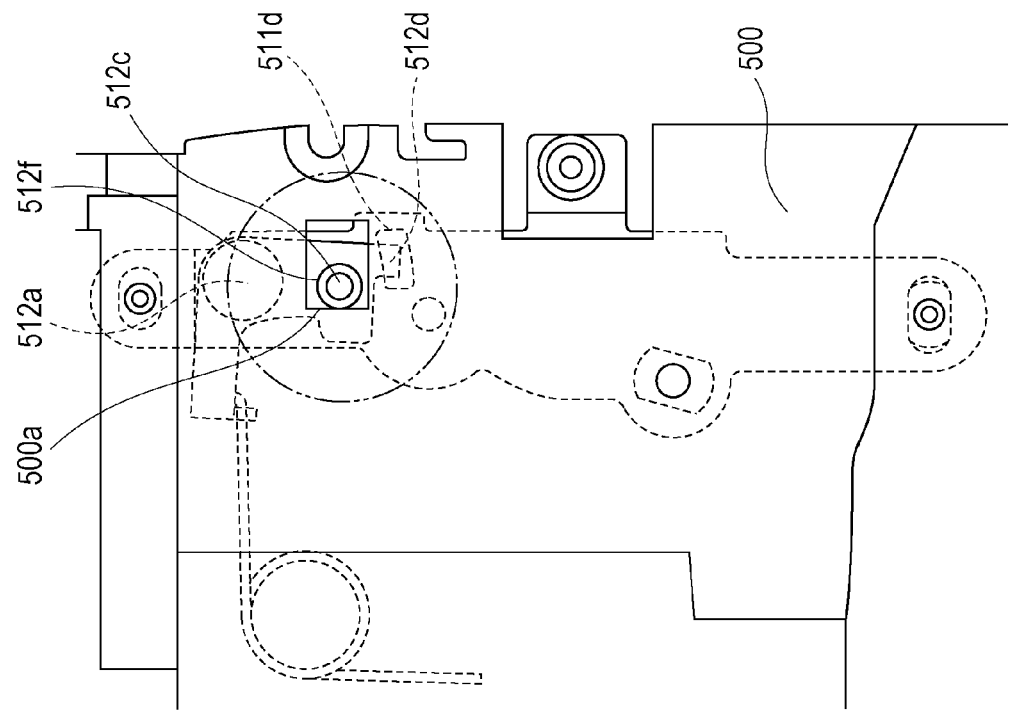

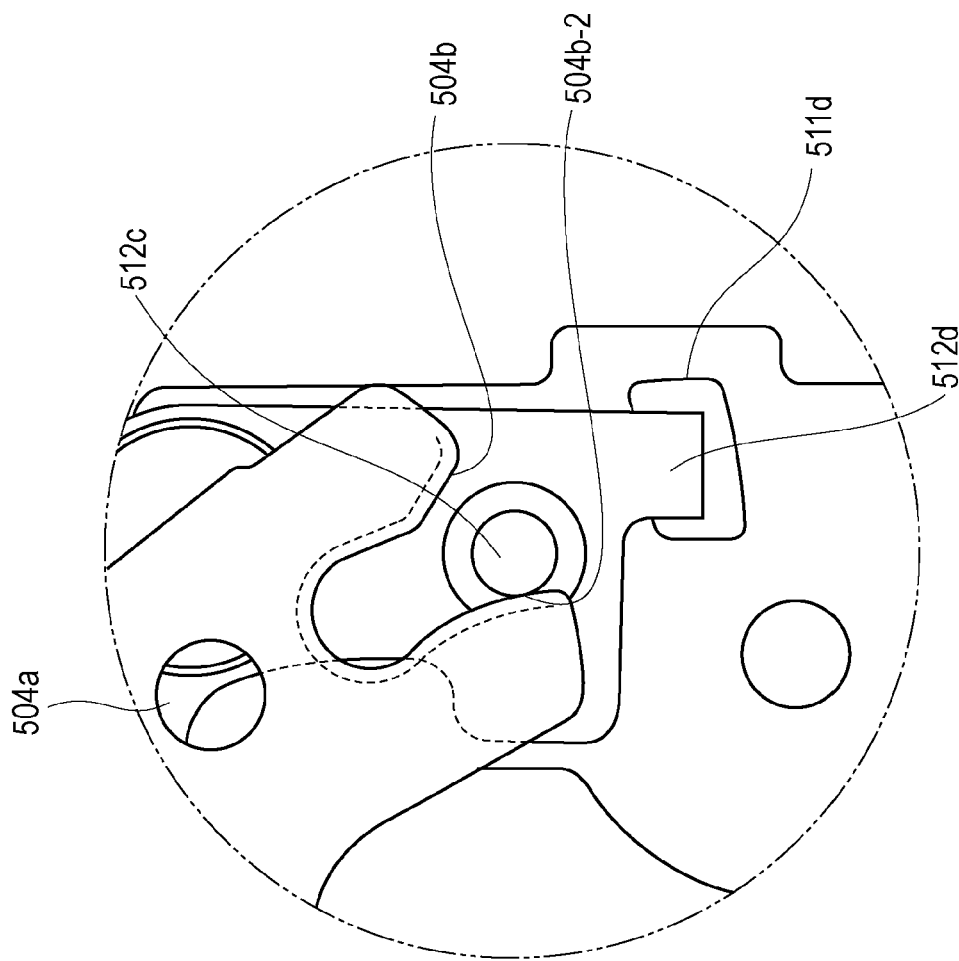
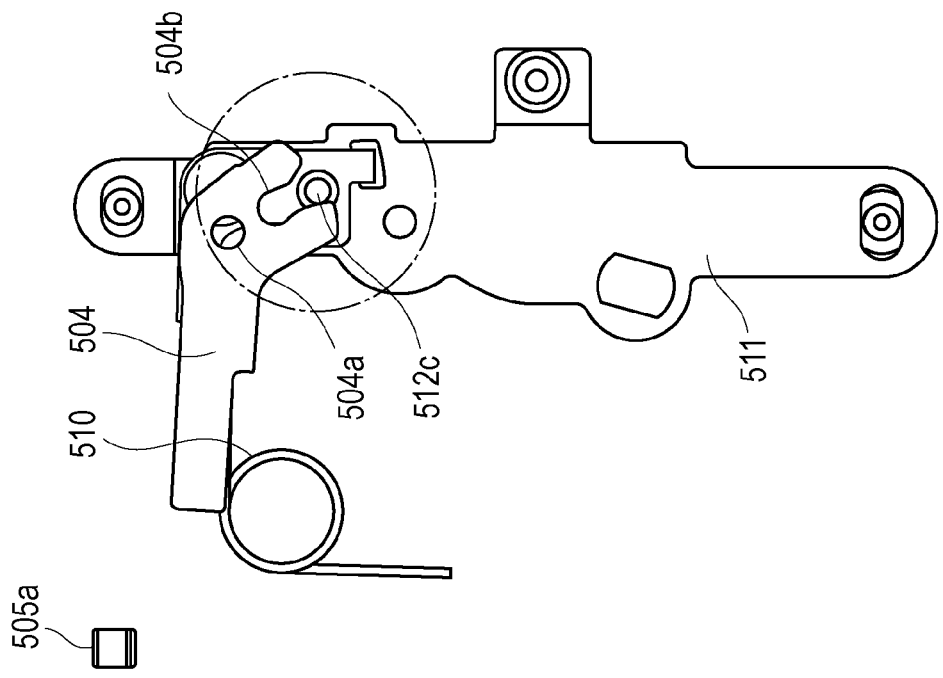

ically, FIG. 4A is a left side view of the mirror unit,
CAMERA

BACKGROUND OF THE INVENTION

1. Field of the Invention

The present invention relates to a camera such as a digital single-lens reflex camera.

2. Description of the Related Art

A single-lens reflex camera includes a main mirror and a sub-mirror both held (in a mirror-down position) between an imaging lens and an image pickup unit. At the startup of exposure, the main mirror and the sub-mirror are retracted (into a mirror-up position) from the mirror-down position between the imaging lens and the image pickup unit. After the end of the exposure, the main mirror and the sub-mirror are returned to the mirror-down position again.

In such a single-lens reflex camera, it is known to drive the sub-mirror between the mirror-down position and the mirror-up position by employing a toggle spring (see Japanese Patent Laid-Open No. 2011-85762). When the sub-mirror is driven between the mirror-down position and the mirror-up position by employing the toggle spring, the toggle spring is arranged such that the sub-mirror can be urged in a mirror-down direction at the mirror-down position and can be urged in a mirror-up direction at the mirror-up position.

However, when the sub-mirror is driven between the mirror-down position and the mirror-up position by employing the toggle spring, large torque is required to reverse an urging direction of the toggle spring. Accordingly, the above-mentioned mechanism is disadvantageous when the mirror has to be driven at a high speed.

SUMMARY OF THE INVENTION

The present invention provides a camera including a mirror holder arranged to hold a mirror and being rotatable between a mirror-up position and a mirror-down position, a mirror box, an adjusting member arranged to adjust the mirror-down position of the mirror holder with rotation of the adjusting member relative to the mirror box, a rotating member rotatably mounted to the adjusting member, and an urging member arranged to urge the rotating member in one direction. The mirror box includes a hole and the mirror holder includes a cam portion. The rotating member includes a contact portion arranged to be able to contact with an edge of the hole and a follower portion arranged to be able to trace the cam portion. When the mirror holder is at the mirror-down position, the follower portion traces a first region of the cam portion to urge the mirror holder toward the mirror-down position by an urging force of the urging member. When the mirror holder is at the mirror-up position, the follower portion traces a second region of the cam portion to urge the mirror holder toward the mirror-up position by the urging force of the urging member. When the mirror holder is at an intermediate position between the mirror-down position and the mirror-up position, the contact portion is contacted with the edge of the hole by the urging force of the urging member.

According to the present invention, the mirror can be urged in a mirror-down direction at the mirror-down position and can be urged in a mirror-up direction at the mirror-up position without needing large torque when the urging direction is reversed. Moreover, the mirror can be driven stably.

Further features of the present invention will become apparent from the following description of exemplary embodiments with reference to the attached drawings.

BRIEF DESCRIPTION OF THE DRAWINGS

FIG. 4A is a left side view of the mirror unit, FIG. 4B is a front view of the mirror unit, and FIG. 4C is a right side view of the mirror unit.

FIGS. 5A and 5B illustrate the mirror unit with omission of some parts constituting the mirror unit.

FIGS. 7A and 7B are sectional views taken along a section VIIA, XA, XIIIA, XVA, XVIA-VIIA, XA, XIIIA, XVA, XVIA in FIG. 5B when the sub-mirror holder is at the mirror-down position.

FIGS. 10A and 10B are sectional views taken along the section VIIA, XA, XIIIA, XVA, XVIA-VIIA, XA, XIIIA, XVA, XVIA in FIG. 5B when the sub-mirror holder is at the intermediate position between the mirror-down position and the mirror-up position.

FIGS. 11A and 11B are sectional views taken along the section VIIIA, XIA, XIVA-VIIIA, XIA, XIVA in FIG. 4B when the sub-mirror holder is at the intermediate position between the mirror-down position and the mirror-up position.

FIGS. 13A and 13B are sectional views taken along the section VIIA, XA, XIIIA, XVA, XVIA-VIIA, XA, XIIIA, XVA, XVIA in FIG. 5B when the sub-mirror holder is at the mirror-up position.

DESCRIPTION OF THE EMBODIMENTS

An embodiment of the present invention will be described below with reference to the drawings.

Figure 1A:
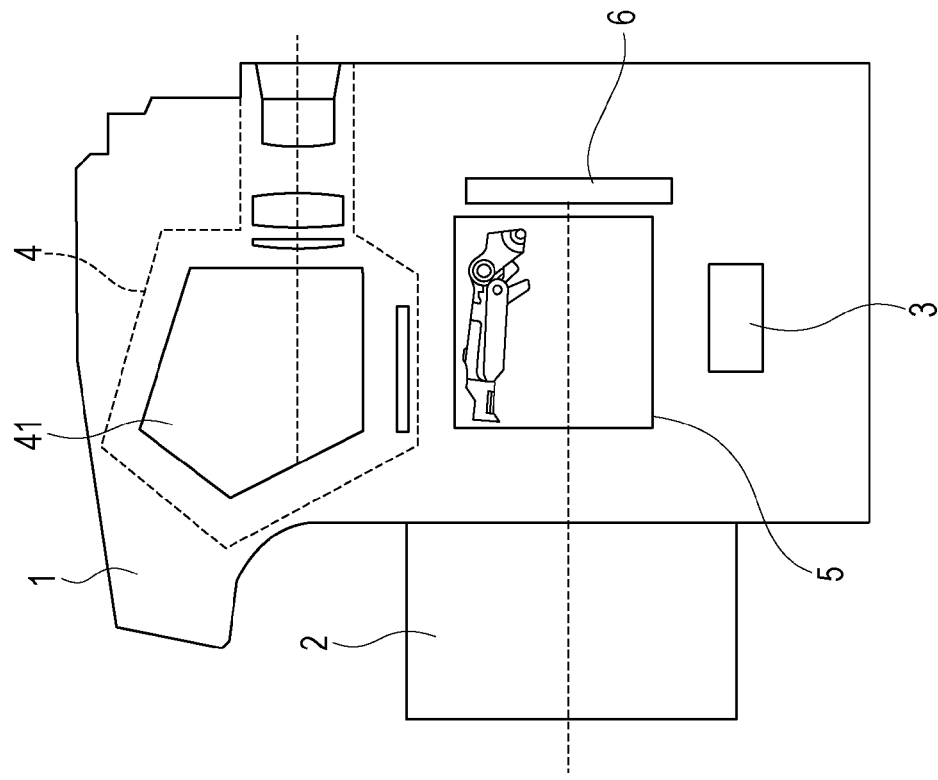
FIGS. 1A and 1B are explanatory views of a digital single-lens reflex camera.
Figure 1B:
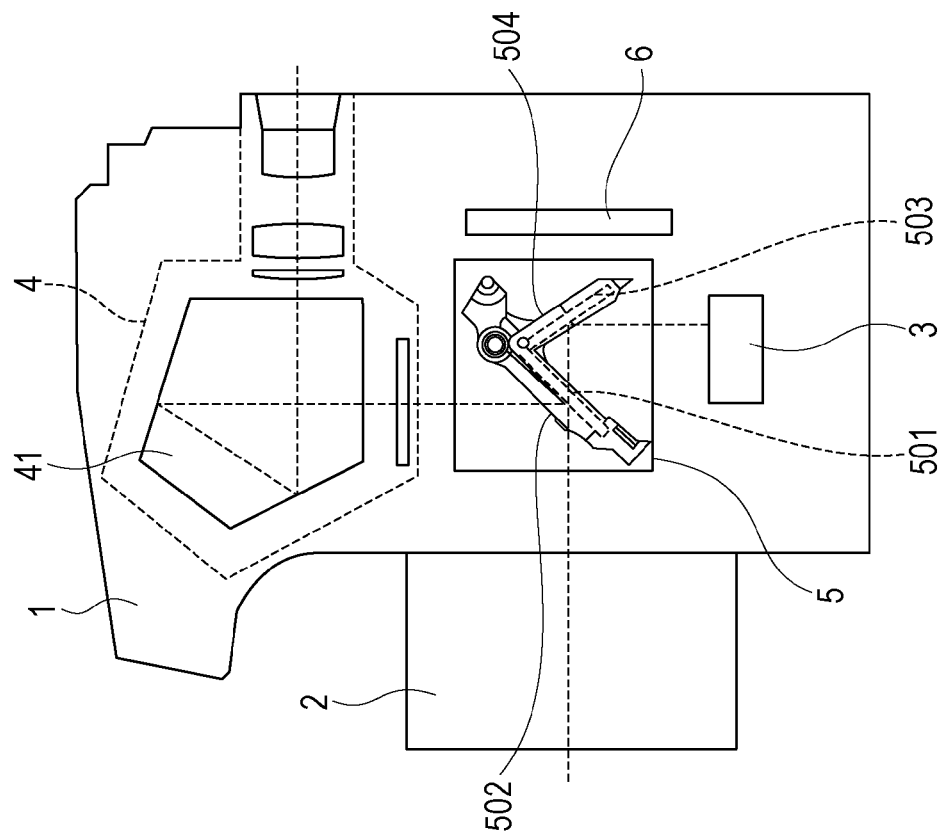

FIGS. 1A and 1B are explanatory views of a digital single-lens reflex camera embodying the present invention.

In FIG. 1A, an interchangeable lens 2 is mounted to a camera body 1. The camera body 1 includes a focus detection unit 3, an optical finder unit 4, a mirror unit 5, and an image pickup sensor 6. The mirror unit 5 includes a main mirror holder 502 for holding a main mirror 501 and a sub-mirror holder 504 for holding a sub-mirror 503.

In a state illustrated in FIG. 1A, a light beam having passed through the interchangeable lens 2 is divided by the main mirror 501. The light beam reflected by the main mirror 501 is introduced to a pentaprism 41 of the optical finder unit 4. On the other hand, the light beam having passed through the main mirror 501 is reflected by the sub-mirror 503 and is introduced to the focus detection unit 3. Accordingly, in the state of FIG. 1A, the light beam having passed through the interchangeable lens 2 is not introduced to the image pickup sensor 6. When the state of FIG. 1A is established, the main mirror holder 502 and the sub-mirror holder 504 are located at the mirror-down position.

In a state illustrated in FIG. 1B, the main mirror holder 502 is retracted to an upper region of the mirror unit 5 from the state of FIG. 1A. At that time, the sub-mirror holder 504 is also retracted to the upper region of the mirror unit 5 in a state overlapped with the main mirror holder 502. In the state of FIG. 1B, the light beam having passed through the interchangeable lens 2 is introduced to the image pickup sensor 6 without being introduced to the optical finder unit 4 and the focus detection unit 3. When the state of FIG. 1B is established, the main mirror holder 502 and the sub-mirror holder 504 are located at the mirror-up position.

As illustrated in FIGS. 1A and 1B, the main mirror holder 502 and the sub-mirror holder 504 are movable between the mirror-down position and the mirror-up position.

Figure 2:
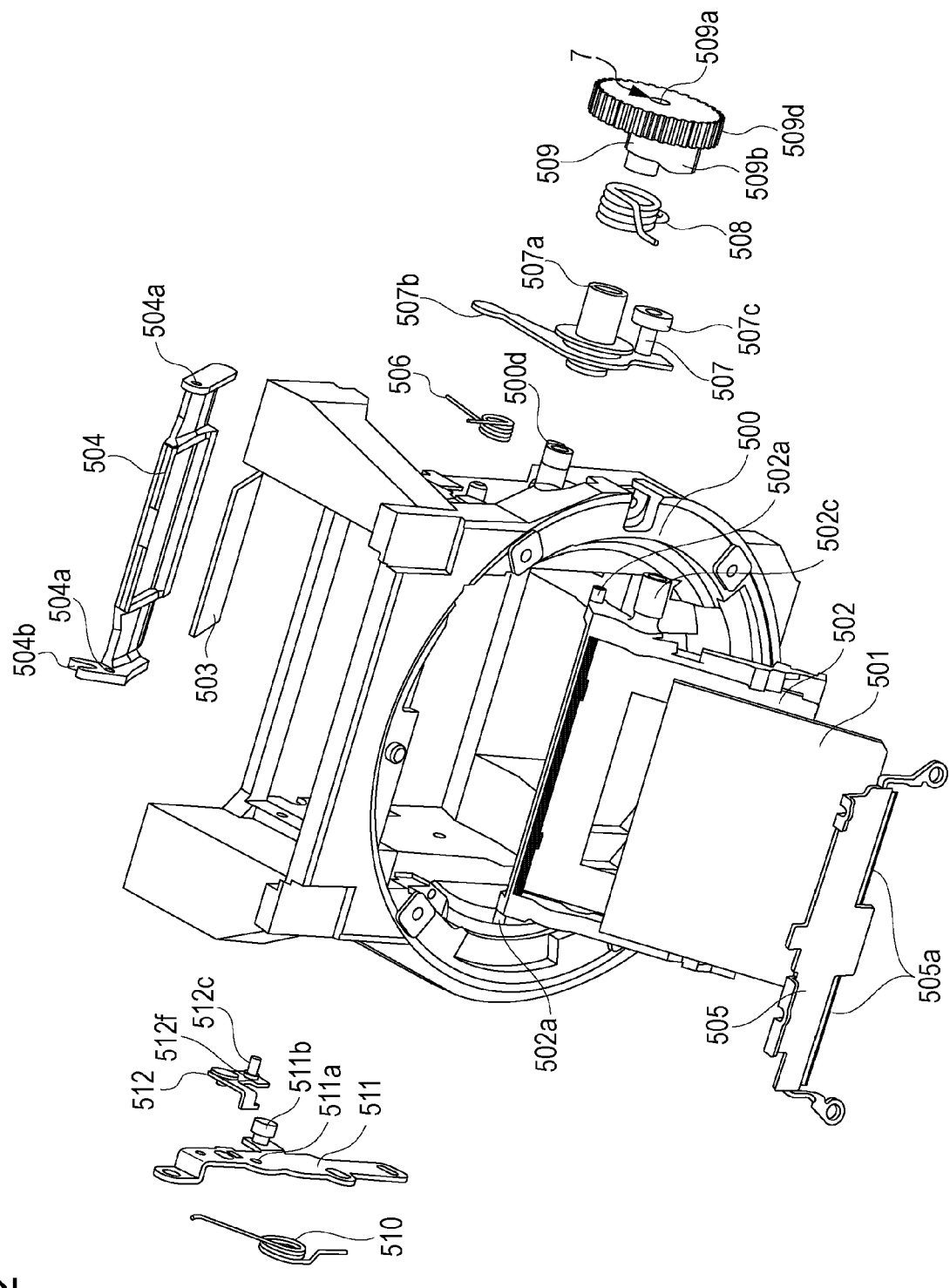
FIG. 2 is an exploded perspective view to explain the structure of a mirror unit.

FIG. 2 is an exploded perspective view to explain the structure of the mirror unit 5.

Figure 3:
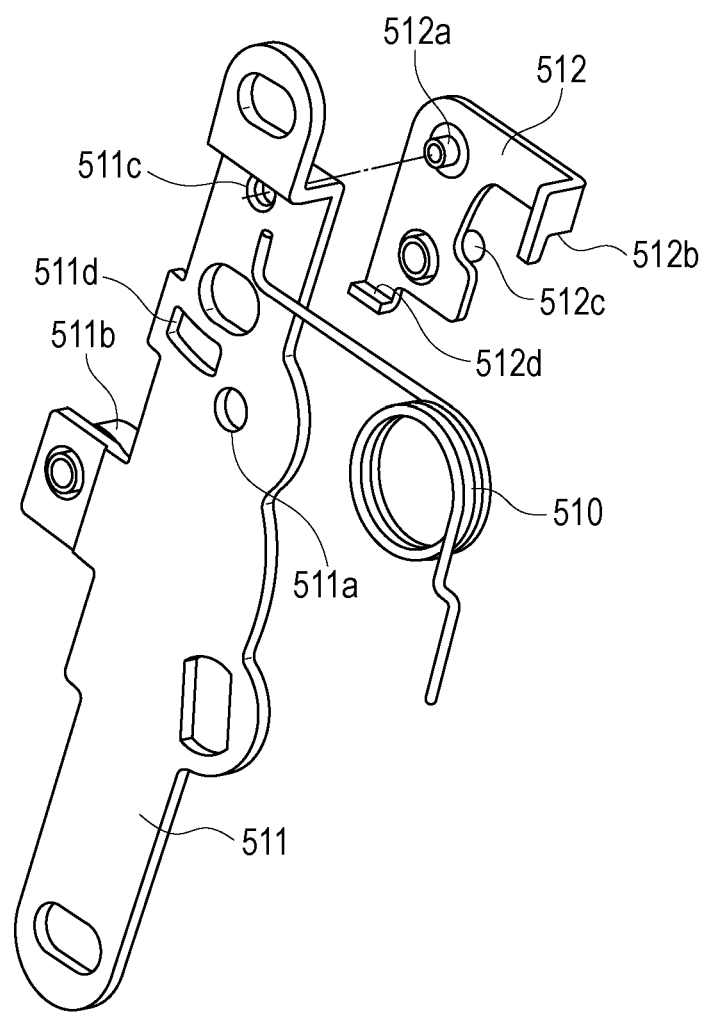
FIG. 3 is an explanatory view to explain, in detail, a sub-mirror angle adjustment member, a sub-mirror bounce suppression member, and a sub-mirror bounce suppression spring, which are all arranged on the left side of a mirror box.

FIG. 3 is an explanatory view to explain, in detail, a sub-mirror angle adjustment member 511, a sub-mirror bounce suppression member 512, and a sub-mirror bounce suppression spring 510, which are all arranged on the left side of a mirror box 500.

Figure 4C:
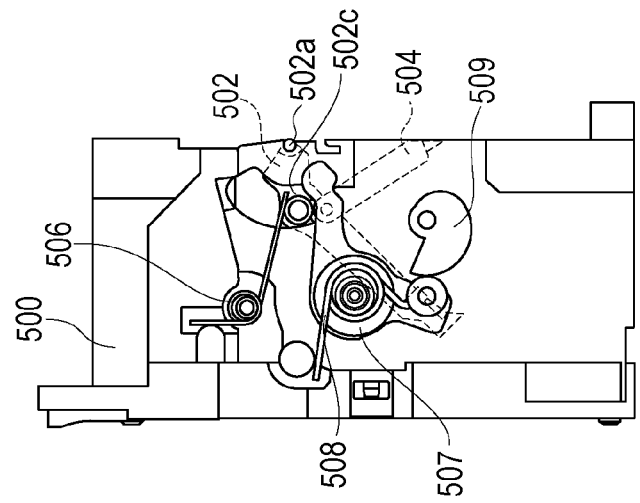
FIGS. 4A, 4B and 4C are three-side views of the mirror unit; specifically.
Figure 4B:
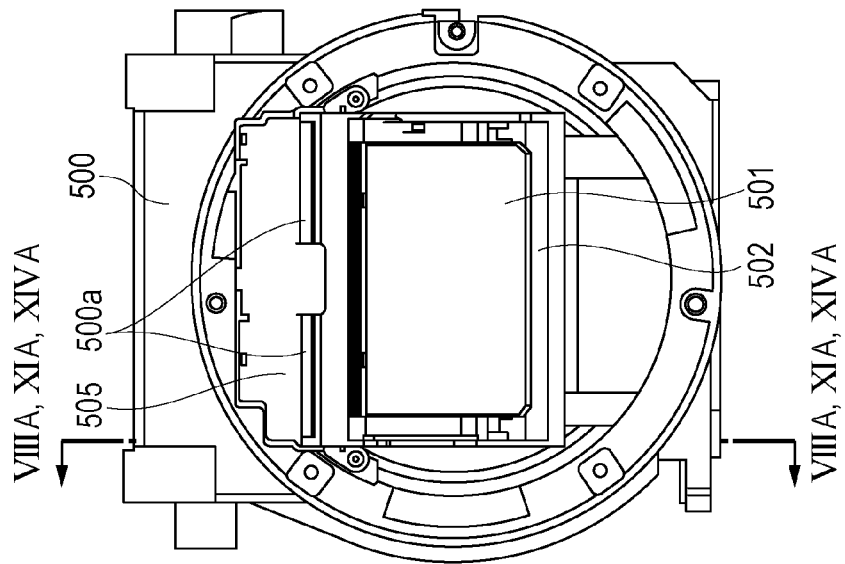
Figure 4A:
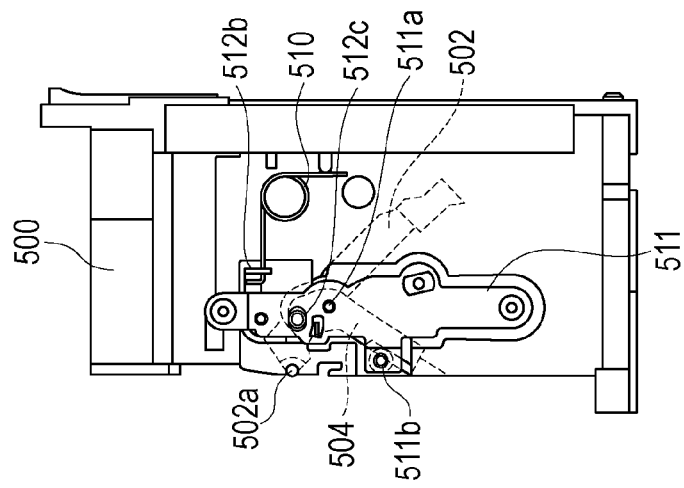

FIGS. 4A, 4B and 4C are three-side views of the mirror unit 5; specifically, FIG. 4A is a left side view of the mirror unit 5, FIG. 4B is a front view of the mirror unit 5, and FIG. 4C is a right side view of the mirror unit 5.

As illustrated in FIG. 2, the main mirror 501 is held by the main mirror holder 502. The main mirror holder 502 includes shafts 502a and 502c.

As illustrated in FIGS. 4A and 4C, the main mirror holder 502 is pivotally supported by the mirror box 500 at the shafts 502a. The main mirror holder 502 is rotatable about the shafts 502a as a pivotal center such that it is rotated between the mirror-down position and the mirror-up position.

As illustrated in FIG. 4C, in a state where the main mirror holder 502 is pivotally supported by the mirror box 500 at the shafts 502a, the shaft 502c is positioned to be exposed through an elongate hole that is formed in the mirror box 500. One end of a mirror-down spring 506 attached to the right side of the mirror box 500 is hooked on the shaft 502c exposed through the elongate hole of the mirror box 500. The other end of the mirror-down spring 506 is hooked on the mirror box 500. Therefore, the main mirror holder 502 is urged toward the mirror-down position by an urging force of the mirror-down spring 506.

As illustrated in FIG. 2, the sub-mirror 503 is held on the sub-mirror holder 504. Holes 504a and a cam portion 504b are formed in the sub-mirror holder 504. The sub-mirror holder 504 is pivotally supported by the main mirror holder 502 in such a state that shafts formed on the main mirror holder 502 are inserted in the holes 504a.

As illustrated in FIGS. 4A and 4C, when the main mirror holder 502 is rotated into the mirror-down position, the sub-mirror holder 504 is also rotated into the mirror-down position where the sub-mirror 503 reflects the light beam having passed through the main mirror 501 to be introduced to the focus detection unit 3.

A mirror-down stopper 500b (see FIG. 12) is formed at a front lower end of the mirror box 500. When the main mirror holder 502 is rotated into the mirror-down position, a contact portion 502b (see FIG. 12) of the main mirror holder 502 is contacted with the mirror-down stopper 500b.

As illustrated in FIGS. 2 and 4B, a mirror stopper 505 is attached to a front upper end of the mirror box 500. A contact portion 505a is formed in the mirror stopper 505. When the main mirror holder 502 is rotated into the mirror-up position, a contact portion 502d (see FIG. 12) of the main mirror holder 502 is contacted with the contact portion 505a of the mirror stopper 505.

As illustrated in FIGS. 2 and 4C, a main mirror driving mechanism for driving the main mirror holder 502 is disposed on the right side of the mirror box 500.

As illustrated in FIGS. 2 and 4C, a mirror driving lever 507 includes a tubular portion 507a, a contact portion 507b, and a follower portion 507c. The mirror driving lever 507 is rotatably mounted to the mirror box 500 in such a state that a shaft 500d formed on the right side of the mirror box 500 is inserted in the tubular portion 507a. When the mirror driving lever 507 is rotated, the contact portion 507b is contacted with the shaft 502c of the main mirror holder 502. When the contact portion 507b of the mirror driving lever 507 rotationally pushes up the shaft 502c of the main mirror holder 502 against the urging force of the mirror-down spring 506, the main mirror holder 502 is brought into the mirror-up position.

As illustrated in FIGS. 2 and 4C, a mirror-up spring 508 is arranged such that the tubular portion 507a is inserted in a winding portion of the mirror-up spring 508. One end of the mirror-up spring 508 is hooked on the mirror driving lever 507, and the other end of the mirror-up spring 508 is hooked on the mirror box 500. When the mirror driving lever 507 is rotated by an urging force of the mirror-up spring 508, the main mirror holder 502 can be moved toward the mirror-up position against the urging force of the mirror-down spring 506.

As illustrated in FIG. 2, a cam gear 509 is mounted to the right side of the mirror box 500 to be rotatable about a rotation center 509a. The cam gear 509 includes a cam portion 509b and a gear portion 509d. The gear portion 509d is meshed with a gear of a driving motor 7 that is disposed on the camera body 1.

As illustrated in FIG. 4C, the cam portion 509b is contacted with the follower portion 507c of the mirror driving lever 507. It is to be noted that the gear portion 509d is omitted in FIG. 4C. When the driving motor 7 is driven, the cam gear 509 is rotated. The rotation of the cam gear 509 causes the follower portion 507c of the mirror driving lever 507 to trace the cam portion 509b, whereby the mirror driving lever 507 is rotated. With the rotation of the mirror driving lever 507, the main mirror holder 502 is moved between the mirror-down position and the mirror-up position.

As illustrated in FIGS. 2 and 4A, a positioning and bounce suppression mechanism for the sub-mirror holder 504 is disposed on the left side of the mirror box 500. More specifically, the sub-mirror angle adjustment member 511, to which the sub-mirror bounce suppression member 512 is pivotally supported, and the sub-mirror bounce suppression spring 510 are mounted to the left side of the mirror box 500.

As illustrated in FIG. 3, the sub-mirror angle adjustment member 511 includes a contact portion 511b, a hole 511c, and a rotation limiting portion 511d.

As illustrated in FIG. 4A, when the sub-mirror holder 504 is rotated into the mirror-down position, the sub-mirror holder 504 is contacted with the contact portion 511b, whereby the mirror-down position of the sub-mirror holder 504 is determined. By rotating the sub-mirror angle adjustment member 511 about a rotation center 511a, the position of the contact portion 511b is changed and the mirror-down position of the sub-mirror holder 504 is also changed.

As illustrated in FIG. 3, the sub-mirror bounce suppression member 512 includes a rotation shaft 512a, a spring hook portion 512b, a follower portion 512c, and an engaging portion 512d. As illustrated in FIG. 2, a contact portion 512f is formed at the root of the follower portion 512c. The rotation shaft 512a of the sub-mirror bounce suppression member 512 is inserted in the hole 511c of the sub-mirror angle adjustment member 511. In addition to the insertion of the rotation shaft 512a, the engaging portion 512d of the sub-mirror bounce suppression member 512 is inserted in the rotation limiting portion 511d of the sub-mirror angle adjustment member 511. Accordingly, the sub-mirror bounce suppression member 512 is mounted to the sub-mirror angle adjustment member 511 to be rotatable within a certain range. The sub-mirror bounce suppression member 512 functions as a rotating member. The rotatable range of the sub-mirror bounce suppression member 512 is limited to a movable range of the engaging portion 512d within the rotation limiting portion 511d. The follower portion 512c and the contact portion 512f of the sub-mirror bounce suppression member 512 are inserted in a hole 500a (see FIGS. 8A and 8B) formed in the left side of the mirror box 500. The follower portion 512c traces the cam portion 504b of the sub-mirror holder 504.

As illustrated in FIG. 4A, one end of the sub-mirror bounce suppression spring 510 is hooked on the spring hook portion 512b of the sub-mirror bounce suppression member 512. The other end of the sub-mirror bounce suppression spring 510 is hooked on the mirror box 500. The sub-mirror bounce suppression spring 510 applies an urging force acting to rotate the sub-mirror bounce suppression member 512 counterclockwise. Thus, the sub-mirror bounce suppression spring 510 functions as an urging member for urging the sub-mirror bounce suppression member 512 in one direction.

FIGS. 5A and 5B illustrate the mirror unit 5 with omission of some parts constituting the mirror unit 5 for easier understanding of the explanation.

FIG. 5A corresponds to FIG. 4B while the mirror box 500 is omitted and only the contact portion 505a of the mirror stopper 505 is illustrated in FIG. 5A. FIG. 5B is further simplified by omitting, from FIG. 5A, the main mirror 501, the main mirror holder 502, and the main mirror driving mechanism disposed on the right side of the mirror box 500.

Figure 6:
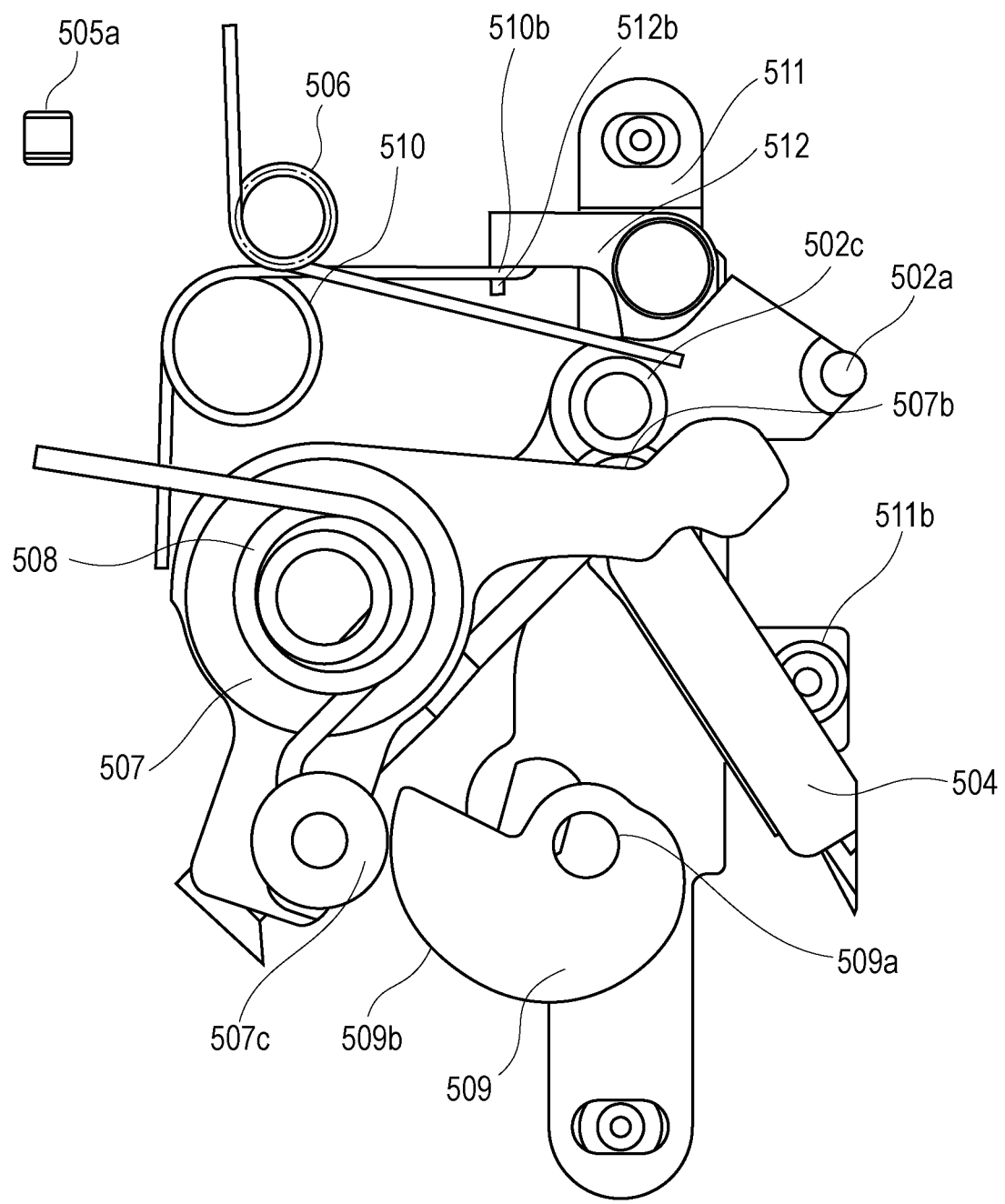
FIG. 6 is an illustration looking in a direction denoted by an arrow A in FIG. 5A when a sub-mirror holder is at a mirror-down position.

FIG. 6 illustrates the state of FIG. 5A, looking in a direction denoted by an arrow A in FIG. 5A. Specifically, FIG. 6 is an illustration looking in the direction denoted by the arrow A in FIG. 5A when the main mirror holder 502 and the sub-mirror holder 504 are at the mirror-down position.

In the state of FIG. 6, the mirror-up spring 508 applies an urging force to rotate the mirror driving lever 507 counterclockwise. However, because the follower portion 507c of the mirror driving lever 507 is contacted with the cam portion 509b of the cam gear 509, the mirror driving lever 507 is not rotated counterclockwise and is held standstill. Furthermore, in the state of FIG. 6, the contact portion 507b of the mirror driving lever 507 is not contacted with the shaft 502c of the main mirror holder 502. Accordingly, the shaft 502c of the main mirror holder 502 is urged by the urging force of the mirror-down spring 506 in the mirror-down direction.

When the main mirror holder 502 is at the mirror-down position, the sub-mirror holder 504 is also at the mirror-down position where it is contacted with the contact portion 511b of the sub-mirror angle adjustment member 511.

FIG. 7A is a sectional view taken along a section VIIA, XA, XIIIA, XVA, XVIA-VIIA, XA, XIIIA, XVA, XVIA in FIG. 5B. Specifically, FIG. 7A is a sectional view, corresponding to FIG. 6, taken along the section VIIA, XA, XIIIA, XVA, XVIA-VIIA, XA, XIIIA, XVA, XVIA in FIG. 5B when the sub-mirror holder 504 is at the mirror-down position. FIG. 7B is an enlarged view of an area surrounded by a dotted line in FIG. 7A.

In a state of FIG. 7A, because the one end of the sub-mirror bounce suppression spring 510 is hooked on the spring hook portion 512b of the sub-mirror bounce suppression member 512, the sub-mirror bounce suppression member 512 is urged clockwise about the rotation center (shaft) 512a.

At that time, the follower portion 512c of the sub-mirror bounce suppression member 512 is contacted with a first region 504b-1 of the cam portion 504b of the sub-mirror holder 504. A position where the follower portion 512c is contacted with the first region 504b-1 of the cam portion 504b is located under the rotation center 512a of the sub-mirror bounce suppression member 512 and above the rotation center (hole) 504a of the sub-mirror holder 504. The first region 504b-1 of the cam portion 504b has such a shape that, when the follower portion 512c is contacted with the first region 504b-1 of the cam portion 504b, the sub-mirror holder 504 is urged counterclockwise by the urging force of the sub-mirror bounce suppression spring 510. Therefore, the sub-mirror holder 504 is urged counterclockwise by the urging force of the sub-mirror bounce suppression spring 510. As a result, the sub-mirror holder 504 is urged toward the mirror-down position by the urging force of the sub-mirror bounce suppression spring 510.

In that state, as illustrated in FIG. 7B, the engaging portion 512d is not contacted with any of edges of the rotation limiting portion 511d of the sub-mirror angle adjustment member 511.

Moreover, as illustrated in FIG. 7B, the first region 504b-1, a second region 504b-2, and a third region 504b-3 are formed in the cam portion 504b. As described above, when the sub-mirror holder 504 is at the mirror-down position, the follower portion 512c of the sub-mirror bounce suppression member 512 is contacted with the first region 504b-1 of the cam portion 504b of the sub-mirror holder 504. Hence, the sub-mirror holder 504 is urged toward the mirror-down position by the urging force of the sub-mirror bounce suppression spring 510.

Figure 8B:
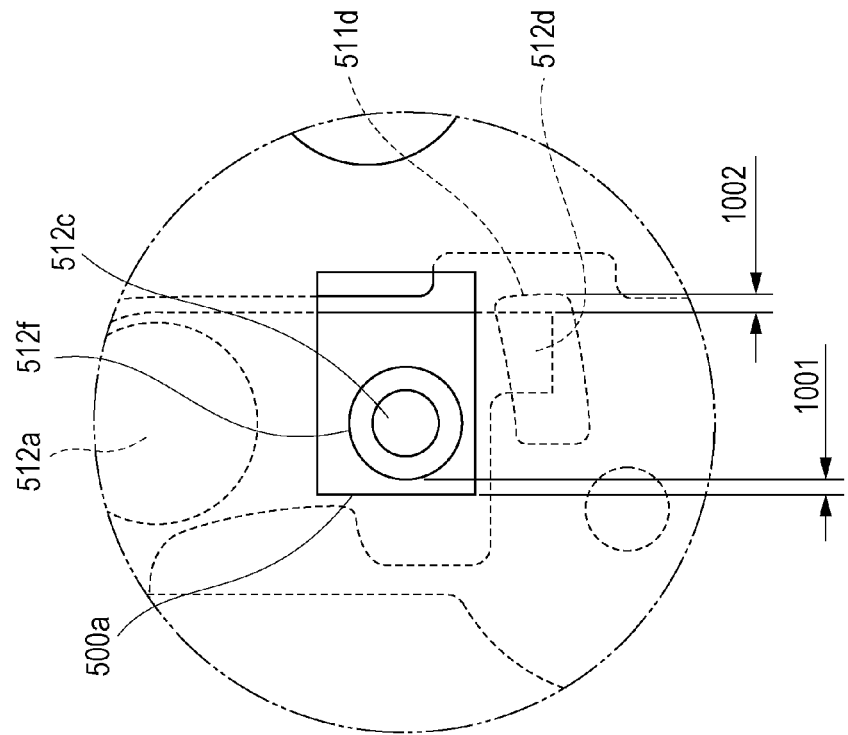
FIGS. 8A and 8B are sectional views taken along a section VIIIA, XIA, XIVA-VIIIA, XIA, XIVA in FIG. 4B when the sub-mirror holder is at the sub-mirror-down position.
Figure 8A:
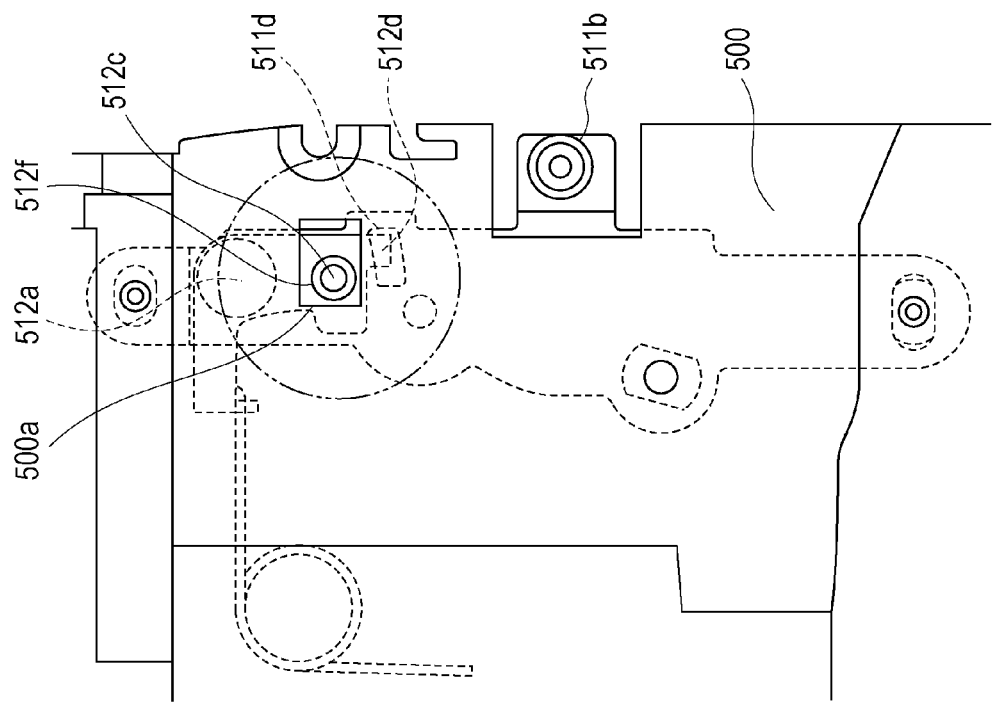

FIG. 8A is a sectional view, corresponding to FIGS. 6, 7A and 7B, taken along the section VIIIA, XIA, XIVA-VIIIA, XIA, XIVA in FIG. 4B when the sub-mirror holder 504 is at the mirror-down position. FIG. 8B is an enlarged view of an area surrounded by a dotted line in FIG. 8A.

As illustrated in FIGS. 8A and 8B, when the sub-mirror holder 504 is at the mirror-down position, a left edge of the hole 500a formed in the mirror box 500 and the contact portion 512f of the sub-mirror bounce suppression member 512 are not contacted with each other. More specifically, as illustrated in FIG. 8B, when the sub-mirror holder 504 is at the mirror-down position, a gap 1001 is formed between the left edge of the hole 500a and the contact portion 512f. Furthermore, in that state, a gap 1002 is formed between the right edge of the rotation limiting portion 511d and the engaging portion 512d.

Figure 9:
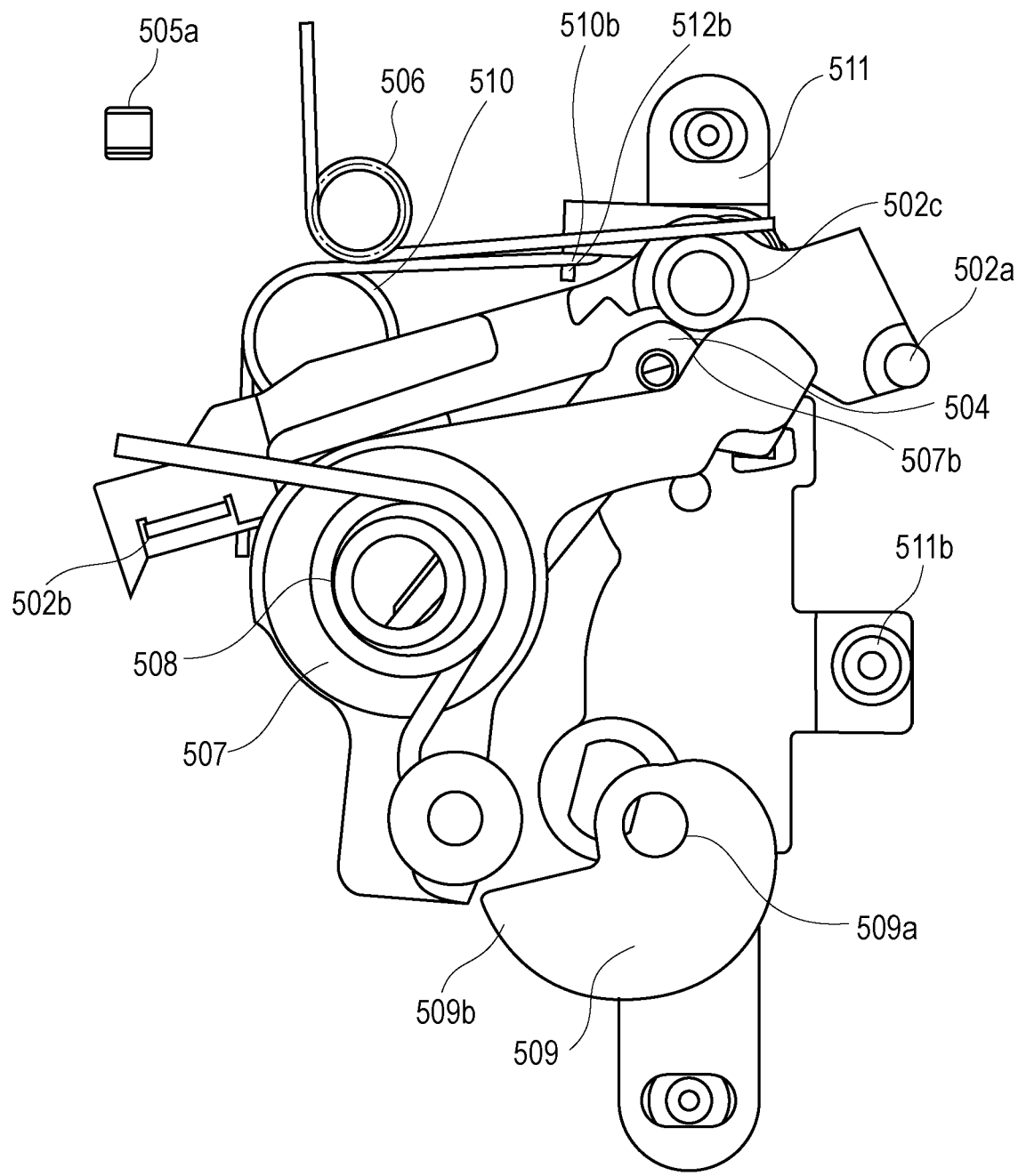
FIG. 9 is an illustration looking in the direction denoted by the arrow A in FIG. 5A when the sub-mirror holder is at an intermediate position between the mirror-down position and a mirror-up position.

FIG. 9 is an illustration looking in the direction denoted by the arrow A in FIG. 5A when the main mirror holder 502 and the sub-mirror holder 504 are at an intermediate position between the mirror-down position and the mirror-up position.

Specifically, FIG. 9 illustrates a state where the cam gear 509 is rotated counterclockwise from the state of FIG. 6 to such an extent that the contact between the follower portion 507c of the mirror driving lever 507 and the cam portion 509b of the cam gear 509 is released. In such a state, the mirror driving lever 507 is rotated counterclockwise by the urging force of the mirror-up spring 508. The contact portion 507b of the mirror driving lever 507 is contacted with the shaft 502c of the main mirror holder 502, thus rotationally pushing up the shaft 502c of the main mirror holder 502 against the urging force of the mirror-down spring 506.

FIG. 10A is a sectional view, corresponding to FIG. 9, taken along the section VIIA, XA, XIIIA, XVA, XVIA-VIIA, XA, XIIIA, XVA, XVIA in FIG. 5B when the sub-mirror holder 504 is at the intermediate position between the mirror-down position and the mirror-up position. FIG. 10B is an enlarged view of an area surrounded by a dotted line in FIG. 10A.

In a state of FIG. 10A, the sub-mirror holder 504 is rotated clockwise from the state of FIG. 7A. Therefore, the contact between the follower portion 512c of the sub-mirror bounce suppression member 512 and the first region 504b-1 of the cam portion 504b of the sub-mirror holder 504 is released.

On that occasion, as illustrated in FIG. 10B, the sub-mirror bounce suppression member 512 is rotated clockwise about the rotation center 512a, but the engaging portion 512d thereof is not contacted with the left edge of the rotation limiting portion 511d of the sub-mirror angle adjustment member 511. At the same time, the follower portion 512c of the sub-mirror bounce suppression member 512 is contacted with the third region 504b-3 of the cam portion 504b of the sub-mirror holder 504. The third region 504b-3 has such a shape that, when the follower portion 512c is contacted with the third region 504b-3 of the cam portion 504b, the sub-mirror holder 504 is urged neither clockwise nor counterclockwise by the urging force of the sub-mirror bounce suppression spring 510. Furthermore, in the state of FIGS. 10A and 10B, a position of the rotation center 504a of the sub-mirror holder 504 in the height direction is substantially at the same level as that of the follower portion 512c of the sub-mirror bounce suppression member 512 in the height direction. With such a positional relationship, even when the third region 504b-3 is formed in any shape, it is difficult to urge the sub-mirror holder 504 by the urging force of the sub-mirror bounce suppression spring 510. Accordingly, at the position where the follower portion 512c is contacted with the third region 504b-3 of the cam portion 504b, the sub-mirror holder 504 is not urged toward the mirror-down position and toward the mirror-up position.

FIG. 11A is a sectional view, corresponding to FIGS. 9, 10A and 10B, taken along the section VIIIA, XIA, XIVA-VIIIA, XIA, XIVA in FIG. 4B when the sub-mirror holder 504 is at the intermediate position between the mirror-down position and the mirror-up position. FIG. 11B is an enlarged view of an area surrounded by a dotted line in FIG. 11A.

As illustrated in FIGS. 11A and 11B, when the sub-mirror holder 504 is at the intermediate position between the mirror-down position and the mirror-up position, the left edge of the hole 500a formed in the mirror box 500 and the contact portion 512f of the sub-mirror bounce suppression member 512 are contacted with each other. More specifically, when the sub-mirror holder 504 is moved from the mirror-down position toward the mirror-up position, the sub-mirror bounce suppression member 512 is rotated clockwise about the rotation center 512a by the urging force of the sub-mirror bounce suppression spring 510. Accordingly, the contact portion 512f of the sub-mirror bounce suppression member 512 is moved from the position illustrated in FIG. 8B in a direction to reduce the gap 1001, thus coming into contact with the left edge of the hole 500a.

At that time, the engaging portion 512d of the sub-mirror bounce suppression member 512 is moved from the position illustrated in FIG. 8B in a direction to increase the gap 1002. However, since the contact portion 512f is contacted with the left edge of the hole 500a, the clockwise rotation of the sub-mirror bounce suppression member 512 is limited before the engaging portion 512d comes into contact with the left edge of the rotation limiting portion 511d. The contact of the contact portion 512f with the left edge of the hole 500a determines the position of the sub-mirror bounce suppression member 512 when the sub-mirror holder 504 is at the intermediate position between the mirror-down position and the mirror-up position. Thus, the position of the sub-mirror bounce suppression member 512 when the sub-mirror holder 504 is at the intermediate position between the mirror-down position and the mirror-up position is determined by the mirror box 500.

If the position of the sub-mirror bounce suppression member 512 when the sub-mirror holder 504 is at the intermediate position between the mirror-down position and the mirror-up position is determined by causing the engaging portion 512d to come into contact with the left edge of the rotation limiting portion 511d, the above-mentioned position of the sub-mirror bounce suppression member 512, i.e., the position thereof when the sub-mirror holder 504 is at the intermediate position between the mirror-down position and the mirror-up position, is determined by the sub-mirror angle adjustment member 511.

The sub-mirror angle adjustment member 511 serves to adjust the mirror-down position of the sub-mirror holder 504 with rotation thereof. Accordingly, when the mirror-down position of the sub-mirror holder 504 is adjusted, the position of the sub-mirror bounce suppression member 512 when the sub-mirror holder 504 is at the intermediate position between the mirror-down position and the mirror-up position is also changed. Stated another way, a moving locus of the sub-mirror holder 504 is also changed with the adjustment of the mirror-down position by the sub-mirror angle adjustment member 511. Such a change adversely affects stable operation of the sub-mirror holder 504.

According to the embodiment, even when the mirror-down position of the sub-mirror holder 504 is adjusted to any position, the above-mentioned position of the sub-mirror bounce suppression member 512 is determined by the left edge of the hole 500a formed in the mirror box 500. Thus, the position of the sub-mirror bounce suppression member 512 when the sub-mirror holder 504 is at the intermediate position between the mirror-down position and the mirror-up position is held constant regardless of a rotational angle of the sub-mirror angle adjustment member 511. In other words, the moving locus of the sub-mirror holder 504 is not changed even when the mirror-down position is adjusted by the sub-mirror angle adjustment member 511. As a result, the sub-mirror holder 504 can be driven stably.

Figure 12:
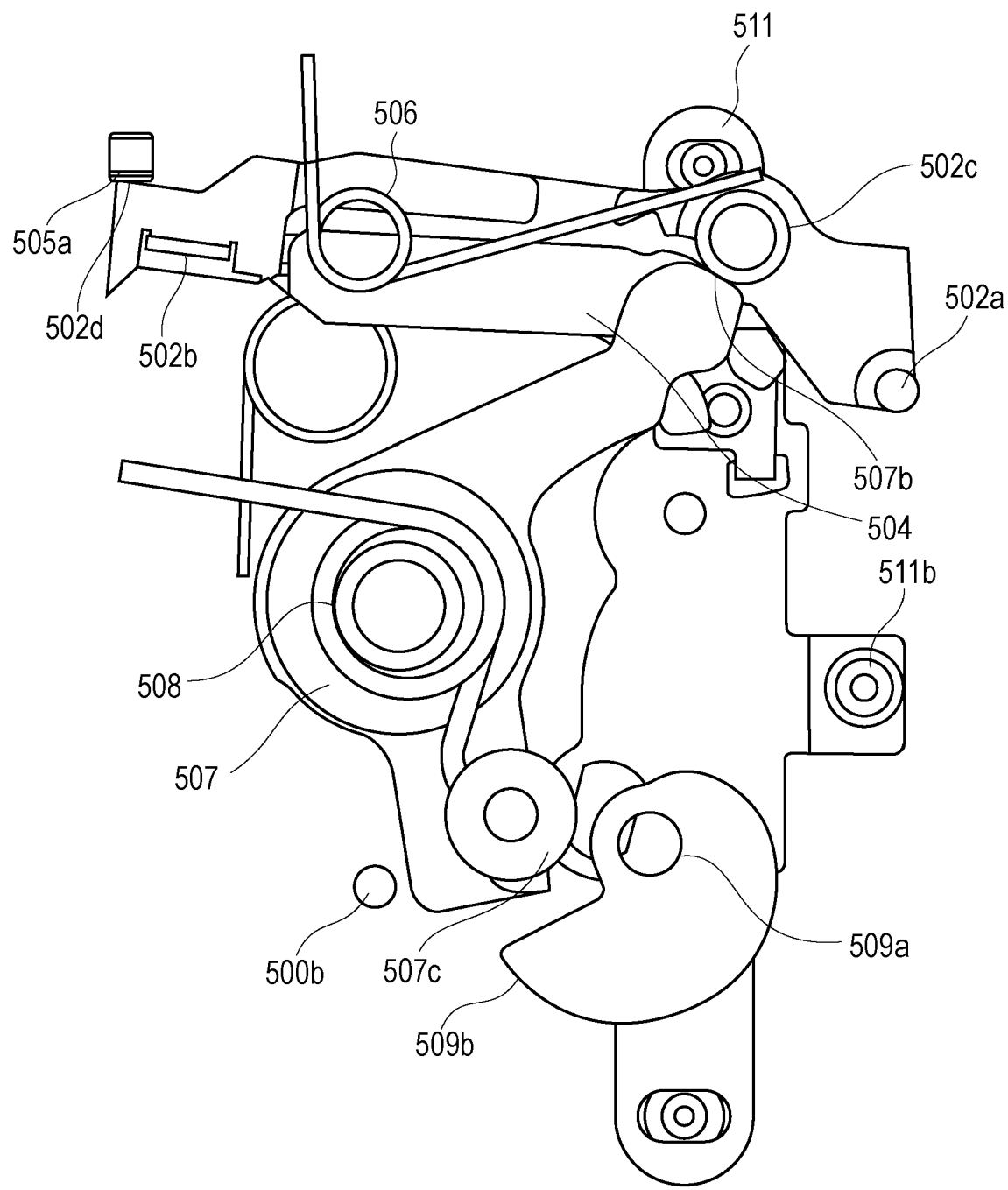
FIG. 12 is an illustration looking in the direction denoted by the arrow A in FIG. 5A when the sub-mirror holder is at the mirror-up position.

FIG. 12 is an illustration looking in the direction denoted by the arrow A in FIG. 5A when the main mirror holder 502 and the sub-mirror holder 504 are at the mirror-up position.

FIG. 12 illustrates a state where the mirror driving lever 507 is further rotated counterclockwise by the urging force of the mirror-up spring 508 from the state of FIG. 9. More specifically, the contact portion 507b of the mirror driving lever 507 further rotationally pushes up the shaft 502c of the main mirror holder 502 against the urging force of the mirror-down spring 506. The contact portion 502d of the main mirror holder 502 is thereby contacted with the contact portion 505a of the mirror stopper 505.

FIG. 13A is a sectional view, corresponding to FIG. 12, taken along the section VIIA, XA, XIIIA, XVA, XVIA-VIIA, XA, XIIIA, XVA, XVIA in FIG. 5B when the sub-mirror holder 504 is at the mirror-up position. FIG. 13B is an enlarged view of an area surrounded by a dotted line in FIG. 13A.

In a state of FIG. 13A, the sub-mirror bounce suppression member 512 is urged clockwise about the rotation center 512a.

At that time, the follower portion 512c of the sub-mirror bounce suppression member 512 is contacted with the second region 504b-2 of the cam portion 504b of the sub-mirror holder 504. A position where the follower portion 512c is contacted with the second region 504b-2 of the cam portion 504b is located under both the rotation center 512a of the sub-mirror bounce suppression member 512 and the rotation center 504a of the sub-mirror holder 504. The second region 504b-2 of the cam portion 504b has such a shape that, when the follower portion 512c is contacted with the second region 504b-2 of the cam portion 504b, the sub-mirror holder 504 is urged clockwise by the urging force of the sub-mirror bounce suppression spring 510. Therefore, the sub-mirror holder 504 is urged clockwise by the urging force of the sub-mirror bounce suppression spring 510. As a result, the sub-mirror holder 504 is urged toward the mirror-up position by the urging force of the sub-mirror bounce suppression spring 510.

In that state, as illustrated in FIG. 13B, the engaging portion 512d is not contacted with any of the edges of the rotation limiting portion 511d of the sub-mirror angle adjustment member 511.

Figure 14B:
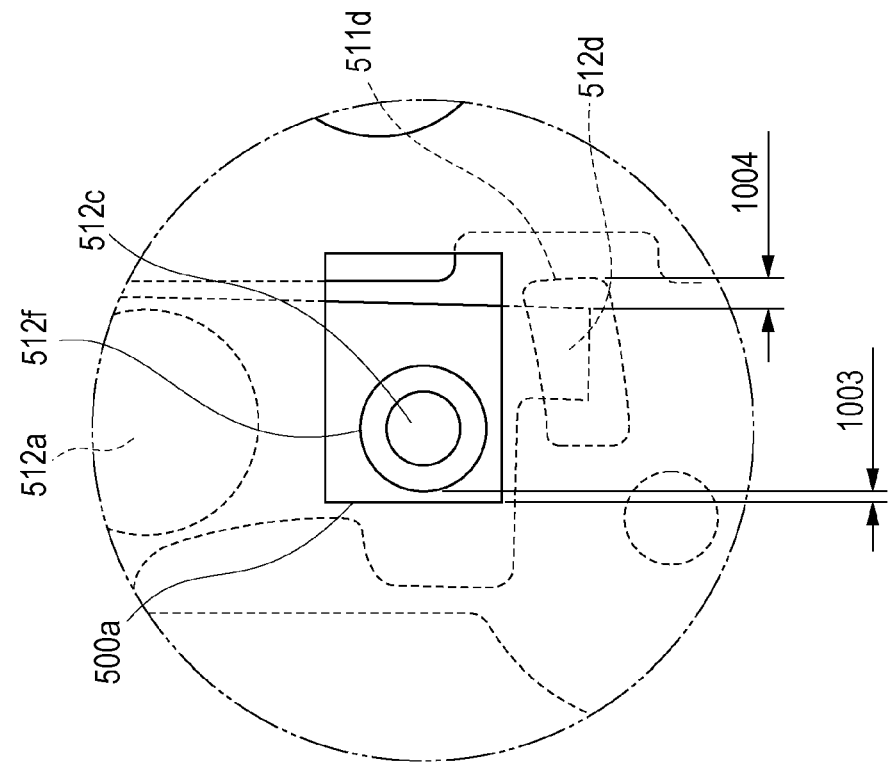
FIGS. 14A and 14B are sectional views taken along the section VIIIA, XIA, XIVA-VIIIA, XIA, XIVA in FIG. 4B when the sub-mirror holder is at the mirror-up position.
Figure 14A:
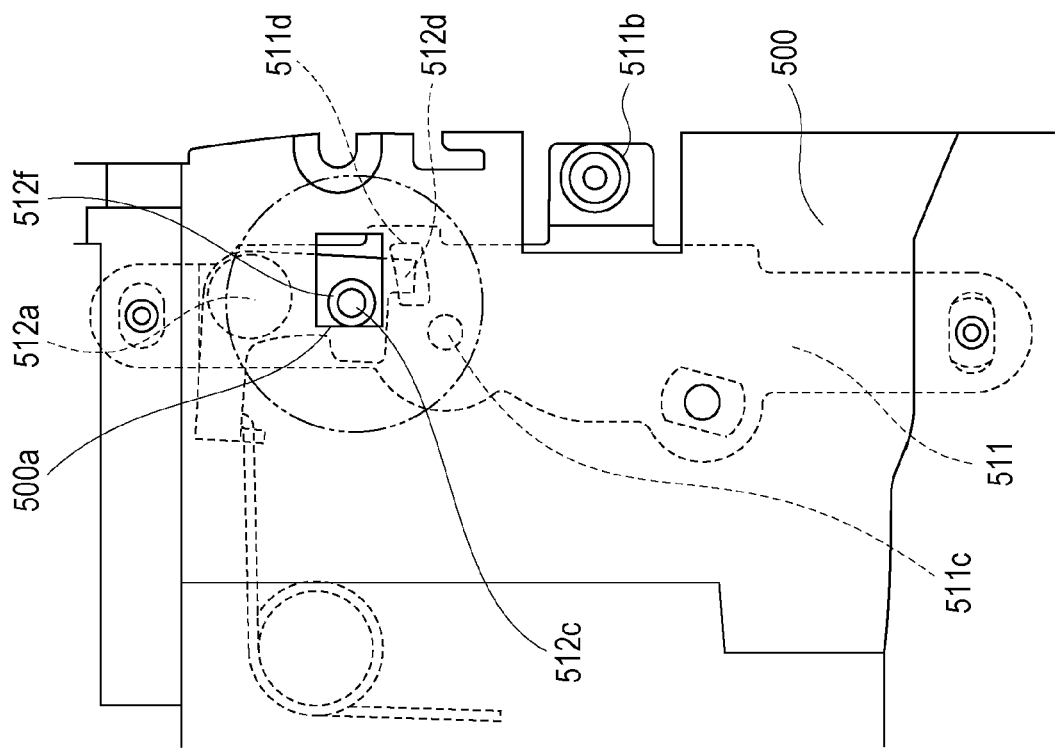

FIG. 14A is a sectional view, corresponding to FIGS. 12, 13A and 13B, taken along the section VIIIA, XIA, XIVA-VIIIA, XIA, XIVA in FIG. 4B when the sub-mirror holder 504 is at the mirror-up position. FIG. 14B is an enlarged view of an area surrounded by a dotted line in FIG. 14A.

As illustrated in FIGS. 14A and 14B, when the sub-mirror holder 504 is at the mirror-up position, the left edge of the hole 500a formed in the mirror box 500 and the contact portion 512f of the sub-mirror bounce suppression member 512 are not contacted with each other. More specifically, as illustrated in FIG. 14B, when the sub-mirror holder 504 is at the mirror-up position, a gap 1003 is formed between the left edge of the hole 500a and the contact portion 512f. Furthermore, in that state, a gap 1004 is formed between the right edge of the rotation limiting portion 511d and the engaging portion 512d.

Figure 15B:
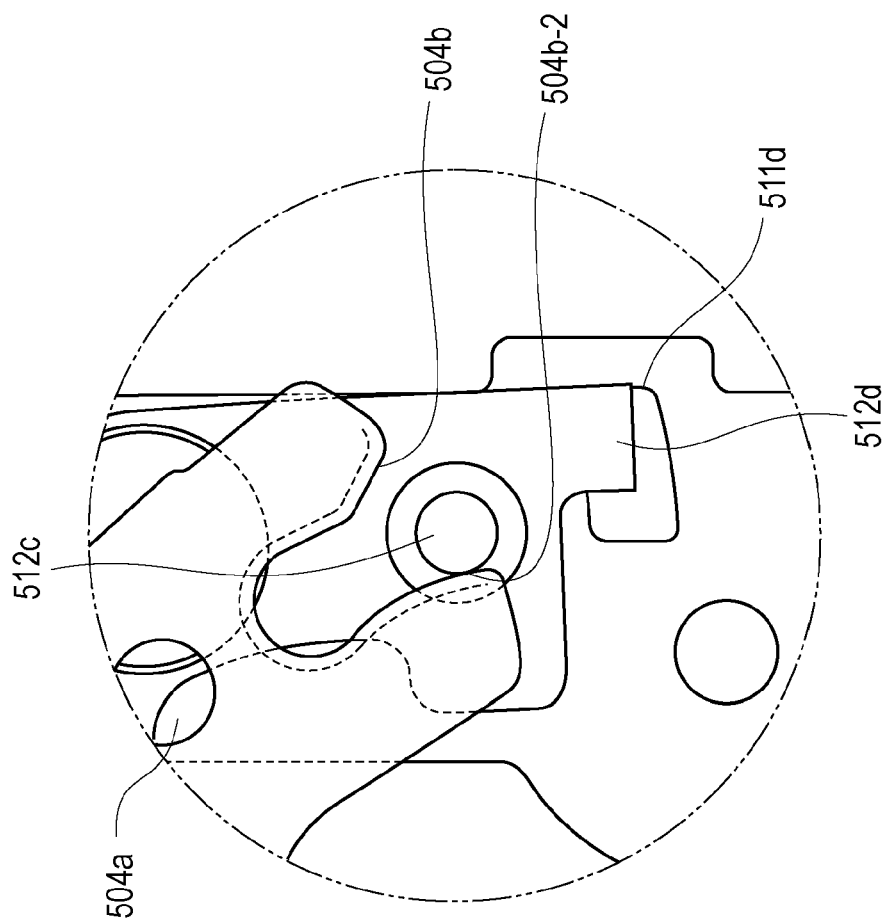
FIGS. 15A and 15B are sectional views taken along the section VIIA, XA, XIIIA, XVA, XVIA-VIIA, XA, XIIIA, XVA, XVIA in FIG. 5B when the sub-mirror holder is bounced near the mirror-up position.
Figure 15A:
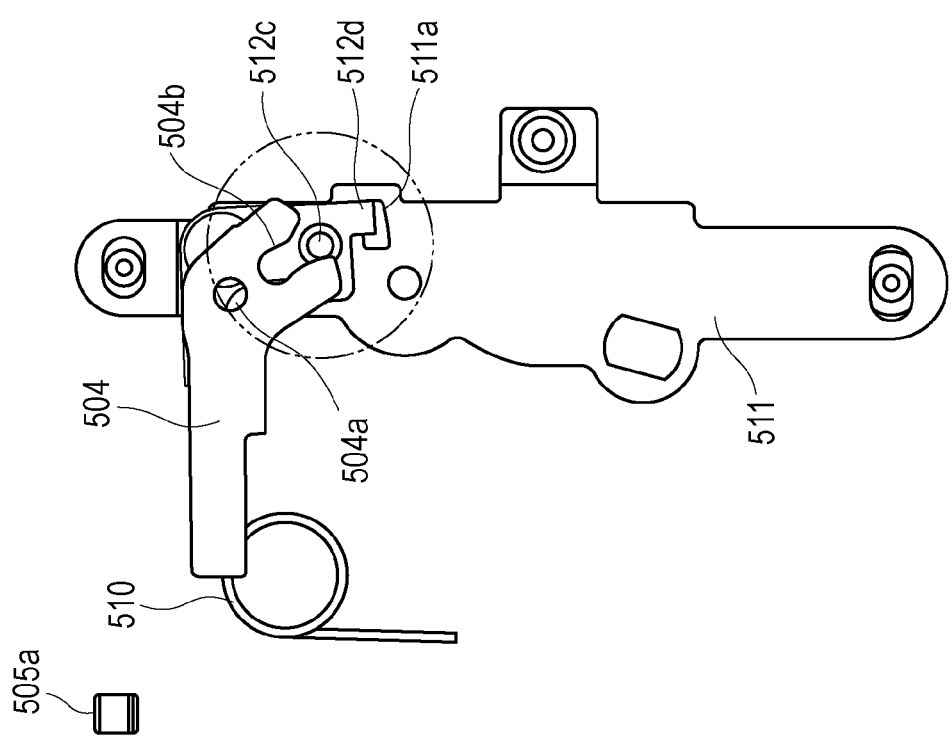

FIG. 15A is a sectional view taken along the section VIIA, XA, XIIIA, XVA, XVIA-VIIA, XA, XIIIA, XVA, XVIA in FIG. 5B when the sub-mirror holder 504 is bounced near the mirror-up position. FIG. 15B is an enlarged view of an area surrounded by a dotted line in FIG. 15A.

When the sub-mirror holder 504 is bounced near the mirror-up position, the second region 504b-2 of the cam portion 504b of the sub-mirror holder 504 pushes the follower portion 512c of the sub-mirror bounce suppression member 512. The sub-mirror bounce suppression member 512 is rotated counterclockwise against the urging force of the sub-mirror bounce suppression spring 510, and the engaging portion 512d is contacted with the right edge of the rotation limiting portion 511d of the sub-mirror angle adjustment member 511. Accordingly, even when the sub-mirror holder 504 is bounced near the mirror-up position, bouncing energy is consumed by causing the sub-mirror bounce suppression member 512 to move against the urging force of the sub-mirror bounce suppression spring 510. Moreover, since the engaging portion 512d is contacted with the right edge of the rotation limiting portion 511d of the sub-mirror angle adjustment member 511, a bounce amount of the sub-mirror holder 504 is limited.

Figure 16A:
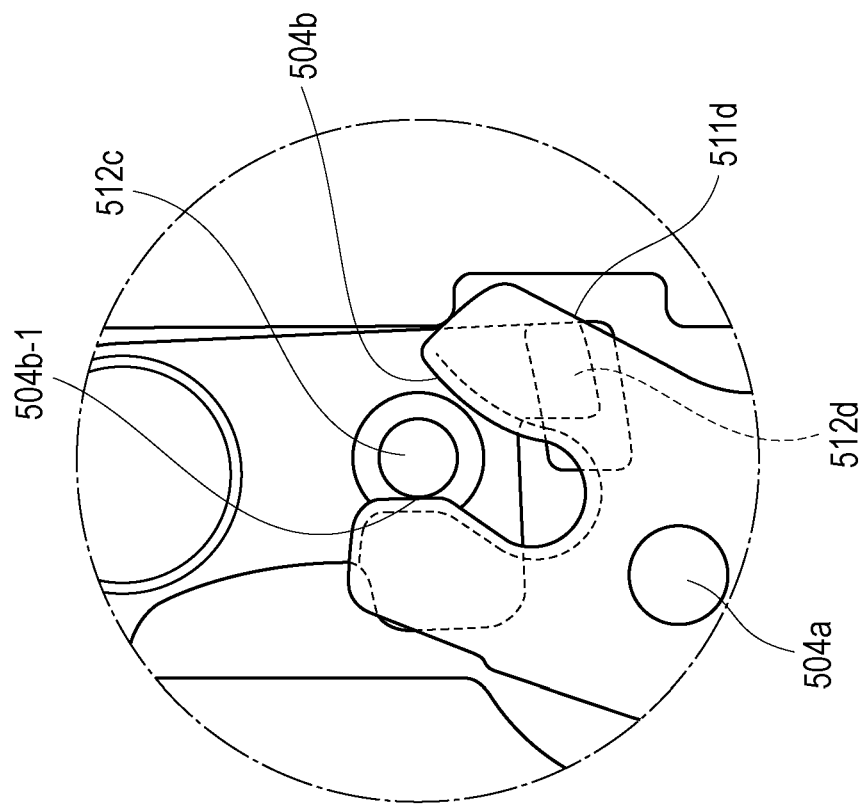
FIGS. 16A and 16B are sectional views taken along the section VIIA, XA, XIIIA, XVA, XVIA-VIIA, XA, XIIIA, XVA, XVIA in FIG. 5B when the sub-mirror holder is bounced near the mirror-down position.
Figure 16B:
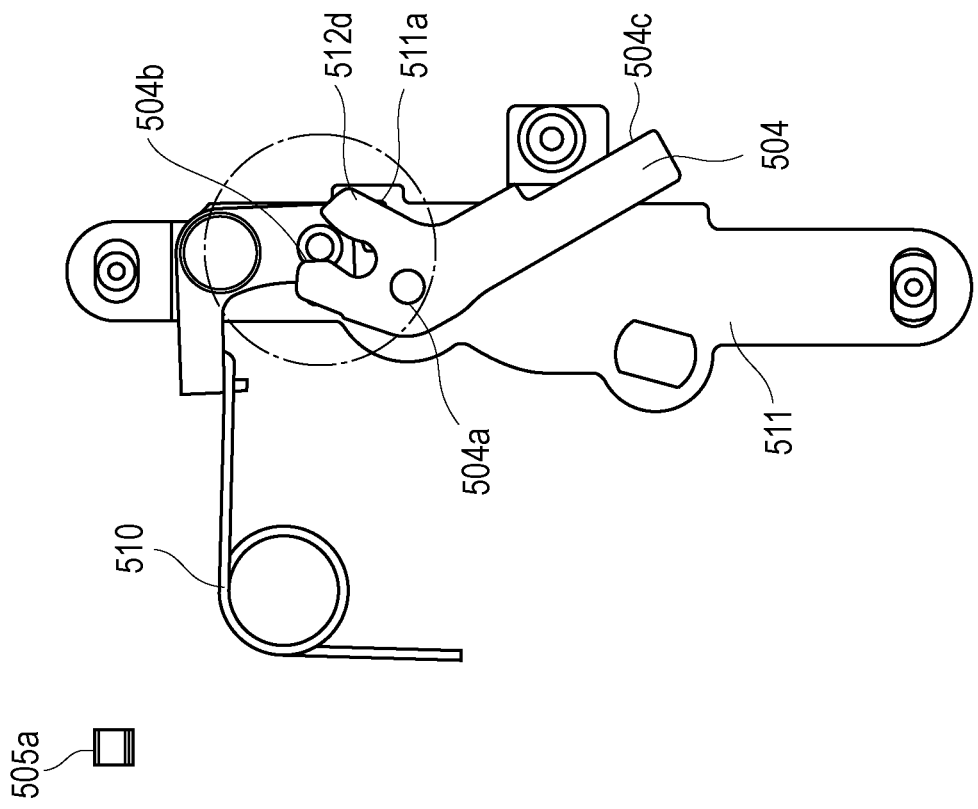

FIG. 16A is a sectional view taken along the section VIIA, XA, XIIIA, XVA, XVIA-VIIA, XA, XIIIA, XVA, XVIA in FIG. 5B when the sub-mirror holder 504 is bounced near the mirror-down position. FIG. 16B is an enlarged view of an area surrounded by a dotted line in FIG. 16A.

When the sub-mirror holder 504 is bounced near the mirror-down position, the first region 504b-1 of the cam portion 504b of the sub-mirror holder 504 pushes the follower portion 512c of the sub-mirror bounce suppression member 512. The sub-mirror bounce suppression member 512 is rotated counterclockwise against the urging force of the sub-mirror bounce suppression spring 510, and the engaging portion 512d is contacted with the right edge of the rotation limiting portion 511d of the sub-mirror angle adjustment member 511. Accordingly, even when the sub-mirror holder 504 is bounced near the mirror-down position, bouncing energy is consumed by causing the sub-mirror bounce suppression member 512 to move against the urging force of the sub-mirror bounce suppression spring 510. Moreover, since the engaging portion 512d is contacted with the right edge of the rotation limiting portion 511d of the sub-mirror angle adjustment member 511, a bounce amount of the sub-mirror holder 504 is limited.

According to the embodiment, as described above, when the sub-mirror holder 504 is at the mirror-down position, the sub-mirror holder 504 can be urged toward the mirror-down position by the urging force of the sub-mirror bounce suppression spring 510. When the sub-mirror holder 504 is at the mirror-up position, the sub-mirror holder 504 can be urged toward the mirror-up position by the urging force of the sub-mirror bounce suppression spring 510. Thus, inversion torque such as generated by a toggle spring is no longer required when the sub-mirror holder 504 is at the intermediate position between the mirror-down position and the mirror-up position. Moreover, the bounce of the sub-mirror holder 504 near the mirror-down position and the bounce of the sub-mirror holder 504 near the mirror-up position can be both suppressed with the simple construction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-022146, filed Feb. 3, 2012, which is hereby incorporated by reference herein in its entirety.

What is claimed is:

1. A camera comprising:
   a mirror holder arranged to hold a mirror and being rotatable between a mirror-up position and a mirror-down position;
   a mirror box;
   an adjusting member arranged to adjust the mirror-down position of the mirror holder with rotation of the adjusting member relative to the mirror box;
   a rotating member rotatably mounted to the adjusting member; and
   an urging member arranged to urge the rotating member in one direction, wherein a hole portion is formed on the mirror box and a cam portion is formed on the mirror holder, wherein the rotating member has a contact portion arranged to be able to contact with an edge of the hole portion and a follower portion arranged to be able to follow the cam portion, wherein in a case where the mirror holder is at the mirror-down position, the follower portion follows a first region of the cam portion to urge the mirror holder toward the mirror-down position by an urging force of the urging member, wherein in a case where the mirror holder is at the mirror-up position, the follower portion follows a second region of the cam portion to urge the mirror holder toward the mirror-up position by the urging force of the urging member, and wherein in a case where the mirror holder is at an intermediate position between the mirror-down position and the mirror-up position, the contact portion is contacted with the edge of the hole portion by the urging force of the urging member.

2. The camera according to claim 1, wherein in a case where the mirror holder is at the intermediate position between the mirror-down position and the mirror-up position, the follower portion follows a third region of the cam portion and the mirror holder is not urged toward the mirror-down position and toward the mirror-up position.

3. The camera according to claim 1, wherein the adjusting member has a limiting portion arranged to limit a rotatable range of the rotating member, wherein in a case where the mirror holder is at the mirror-down position or the mirror-up position, the rotating member is located at a position where rotation of the rotating member is not limited by the limiting portion, and wherein in a case where the mirror holder is bounced near at least one of the mirror-down position and the mirror-up position, the rotating member is located at a position where the rotation of the rotating member is limited by the limiting portion.

4. The camera according to claim 3, wherein in a case where the mirror holder is at the intermediate position between the mirror-down position and the mirror-up position, the contact portion comes into contact with the edge of the hole portion before the rotation of the rotating member is limited by the limiting portion.

5. The camera according to claim 3, wherein the limiting portion limits a rotation range of the rotating member upon the rotating member contacting with the adjusting member, wherein in a case where the mirror holder is at the mirror-down position or the mirror-up position, the rotating member is not contacted with the adjusting member, and wherein in a case where the mirror holder is bounced near the mirror-down position or near the mirror-up position, the rotating member is contacted with the adjusting member.

6. The camera according to claim 5, wherein in a case where the mirror holder is at the intermediate position between the mirror-down position and the mirror-up position, the contact portion comes into contact with the edge of the hole portion before the rotating member comes into contact with the adjusting member.

* * * * *